United States Patent
Vasyltsov et al.

(10) Patent No.: US 8,208,626 B2
(45) Date of Patent: Jun. 26, 2012

(54) APPARATUS FOR PERFORMING A FAULT DETECTION OPERATION AND METHOD THEREOF

(75) Inventors: Ihor Vasyltsov, Suwon-si (KR);
Joon-Ho Hwang, Seoul (KR)

(73) Assignee: Samsung Electronics Co., Ltd.,
Gyeonggi-do (KR)

( * ) Notice: Subject to any disclaimer, the term of this patent is extended or adjusted under 35 U.S.C. 154(b) by 1377 days.

(21) Appl. No.: 11/826,734

(22) Filed: Jul. 18, 2007

(65) Prior Publication Data

US 2008/0031443 A1    Feb. 7, 2008

(30) Foreign Application Priority Data

Aug. 4, 2006  (KR) .................. 10-2006-0073775

(51) Int. Cl.
*G06F 21/00* (2006.01)
(52) U.S. Cl. ............... 380/2; 380/255; 713/187
(58) Field of Classification Search ............... 380/2
See application file for complete search history.

(56) References Cited

U.S. PATENT DOCUMENTS

| | | | |
|---|---|---|---|
| 5,497,423 A | 3/1996 | Miyaji | |
| 2001/0048741 A1* | 12/2001 | Okeya | 380/28 |
| 2003/0026419 A1* | 2/2003 | Akishita | 380/30 |

FOREIGN PATENT DOCUMENTS

| | | |
|---|---|---|
| JP | 11-052854 | 2/1999 |
| JP | 2000-137436 | 5/2000 |
| JP | 2000-181347 | 6/2000 |
| JP | 2002-323852 | 11/2002 |
| JP | 2003-043915 | 2/2003 |
| JP | 2003-216031 | 7/2003 |
| KR | 1998-0083640 | 12/1998 |
| KR | 1020050062231 A | 6/2005 |

* cited by examiner

*Primary Examiner* — Kim Vu
*Assistant Examiner* — Yogesh Paliwal
(74) *Attorney, Agent, or Firm* — Harness, Dickey & Pierce, P.L.C.

(57) ABSTRACT

An apparatus for performing a fault detection operation and methods thereof are provided. The example apparatus may include a first-coordinate computing unit receiving a first point and a second point in a binary finite field, the first and second points established based on a basic point within a given elliptic curve, each of the first and second points including a first coordinate value and a second coordinate value, the first-coordinate computing unit performing a first addition operation on the first point and the second point to compute a third coordinate value and a second-coordinate computing unit performing a second addition operation on the first and second points to compute a fourth coordinate value, the first and second addition operations computed based on at least one of a difference between the first coordinate values of the first and second points and a difference between the second coordinate values of the first and second points.

21 Claims, 9 Drawing Sheets

APPARATUS FOR PERFORMING A FAULT DETECTION OPERATION AND METHOD THEREOF

PRIORITY STATEMENT

This application claims the benefit of Korean Patent Application No. 10-2006-0073775, filed on Aug. 4, 2006 in the Korean Intellectual Property Office, the disclosure of which is incorporated herein in their entirety by reference.

BACKGROUND OF THE INVENTION

1. Field of the Invention

Example embodiments of the present application relate generally to an apparatus for performing a fault detection operation and methods thereof, and more particularly to an apparatus for performing a fault detection operation within a cryptography system and methods thereof.

2. Description of the Related Art

Conventional encryption methods may include public key-based encrypting methods, such as the Rivest Shamir Adleman (RSA) encrypting system and the Elliptic Curve Cryptography (ECC) system. Conventional public key-based encrypting methods may use a relatively large integer as a public key to protect a system because an algorithm for integral division may not be defined.

In particular, the ECC system may provide security with a relatively small key size, and thus ECC systems may be implemented within smart cards and electronic signatures. The ECC system may include a cryptographic process for encrypting/decrypting information, based on a specific addition which is defined by a numerical formula referred to as an "elliptic curve".

A conventional ECC system may include a random elliptic curve E, and a point P on the elliptic curve E, as system parameters. For example, a first user who desires to establish a cryptographic communication may randomly generate an integer k, and may multiply the integer k by P to obtain $Q(=k \times P)$. The first user may disclose Q as a public key, and may securely store the integer k as his/her secret key. Then, a second user who desires to transmit a message M to the first user in a secret manner may randomly generate an integer d, and may multiply d by P to obtain $A(=d \times P)$. The second user may generate $B(=M+d \times Q)$ by using the public key Q that the first user provides and the message M to be transmitted. The second user may then transmit a cryptograph A,B to the first user.

In the conventional ECC system, the first user who receives the cryptogram A,B from the second user may computes $k \times A$ based on his/her secret key k, and may restore the message M by:

$$M = B - (k \times A) \qquad \text{Equation 1}$$

In order to "attack" or hack the conventional ECC system, a Differential Fault Analysis (DFA) may determine the secret key for a cryptographic system based on the difference between variables used in a given operation. In the DFA, the secret key for the cryptographic system may be determined by injecting a fault into a cryptographic system, and analyzing the result of operation corresponding to the injected fault.

For example, the conventional ECC system may use values stored in a register when performing a given operation. However, the value stored in the register, or scheduled to be stored in the register, may be adjusted or altered by the fault. Thus, an error corresponding to the altered value may affect the result of the given operation. Information relating to the secret key may thereby inadvertently be disclosed based on an analysis of the result of the given operation containing the error.

FIG. 1 is a flowchart illustrating a Calculate Twice and Check (CT&C) process 100 corresponding to a conventional DFA countermeasure. In the CT&C process 100, a random point P on an elliptic curve may be selected (at S110), a first comparison value Q1 may be computed by multiplying P by k (at S120) and a second comparison value Q2 may be computed by multiplying P by k (at S130), where k may be an integer value of a secret key.

Referring to FIG. 1, the first comparison result Q1 and the second comparison result Q2 may be compared (at S140). If the first comparison result Q1 and the second comparison result Q2 are equal to each other, a fault or error is determined not to have occurred, and one of the first comparison result Q1 and the second comparison result Q2 may be output as the result Q (at S150). Alternatively, if the first comparison result Q1 is determined not to be equal to the second comparison result Q2, a fault or error is determined to have occurred, and a warning signal may be output instead of the result Q (at S160).

FIG. 2 is a flowchart illustrating a Check the Output Point (COP) process 200 corresponding to another conventional DFA countermeasure. In the conventional COP process 200 of FIG. 2, a random point P on an elliptic curve may be selected (at S210), and a comparison value Q may be computed by multiplying P by a given integer k (at S220). The given integer k may denote a secret key.

Referring to FIG. 2, a determination is made as to whether the comparison value Q is a point on the elliptic curve E (at S230). If the comparison value Q is a point on the elliptic curve E, a fault or error is determined not to have occurred, and the result or comparison value Q may be output (at S240). Alternatively, if the comparison value Q is determined not to be a point on the elliptic curve E, an error or fault is determined to have occurred, and a warning signal may be output instead of the result or comparison value Q (at S250).

Referring to FIGS. 1 and 2, the CT&C process 100 of FIG. 1 may require a duplicate multiplication of the comparison values Q1 and Q2, which may waste system resources. The COP process 200 of FIG. 2 may be more simplistic with regard to the computations involved as compared to the CT&C process 100 of FIG. 1. However, the COP process 200 may be relatively limited and the performance thereof may not be sufficient in certain situations, such as during a fault sign changes attack. Accordingly, a Montgomery Power Ladder Algorithm (MPLA) and/or a Fast Montgomery Power Ladder Algorithm (FMPLA) may be deployed in addition to the conventional process of FIG. 1 and/or 2 to handle the DFA.

In a conventional ECC system, a discrete logarithm operation may be performed to compute k based on P and Q. The discrete logarithm operation may be performed by applying the characteristics of an elliptic curve to finite fields, and may be a basis of the cryptographic protocol. Thus, the discrete logarithm operation may refer to an operation of computing k by using Q and P in a formula $Q=k \times P$.

Accordingly, it will be appreciated that scalar multiplication may be representative of one operation performed during a conventional ECC process. In an example, the MPLA may constitute a portion of the scalar multiplication in finite fields. The conventional MPLA will now be described in greater detail.

The MPLA may include two variables defined as shown in Equation 2, below:

$$L_j = \sum_{i=j}^{t-1} k_i 2^{i-j} \quad H_j = L_j + 1 \qquad \text{Equation 2}$$

wherein k may denote a random integer expressed as a plurality of binary bits (e.g., $k=(k_{t-1}, \ldots, k_1, k_0)_2$), t may denote an integer, and $k_i$ may denote an ith bit of k, wherein i may denote an integer. For example, $k_{t-1}$ may be equal to a first logic level (e.g., a higher logic level or logic "1") or a second logic level (e.g., a lower logic level or logic "0").

The relationship between $L_j$ and $H_j$ (e.g., expressions 1 and 2, respectively) may be expressed by:

$$L_j = 2L_{j+1} + k_j = L_{j+1} + H_{j+1} + k_j - 1 = 2H_{j+1} + k_j - 2 \qquad \text{Equation 3}$$

and may be alternatively expressed by:

$$(L_j, H_j) = \begin{cases} (2L_{j+1}, L_{j+1} + H_{j+1}) & \text{if } k_j = 0, \\ (L_{j+1} + H_{j+1}, 2H_{j+1}) & \text{if } k_j = 1. \end{cases} \qquad \text{Equation 4}$$

A process of deriving Equation 4 is well-known to those of ordinary skill in the art, and as such a detailed description thereof has been omitted for the sake of brevity. $L_j$ and $H_j$ may be mapped to two points $P_1$ and $P_2$, respectively, on an elliptic curve in the ECC system of FIG. 3, which will now be described in greater detail.

FIG. 3 is a flowchart illustrating a MPLA process 300 for performing the scalar multiplication within a conventional ECC system. In the MPLA process of FIG. 3, a basic point P and a scalar k may be received (e.g., wherein k may be an integer) (at S301). Next, variables may be set for scalar multiplication (at S303). For example, the scalar k may be set as expressed in Equation 2, a first variable $P_1$ may be set to the basic point P, a second variable $P_2$ may be set to the twice that of the basic point P (e.g., 2×P) and a repetitive parameter or counter i may be set or reset to t–1.

Referring to FIG. 3, after setting the variables, the scalar multiplication Q=k×P may be computed by performing a repetitive operation. Thus, the counter i may be decremented (at S305) and the process 300 may determine whether a binary bit $k_i$ is equal to 1 (at S307). The first and second variables $P_1$ and $P_2$ may be updated according to the determination result (at S310 or S311). In S310 and S311, "$P_2 \leftarrow 2P_2$" and "$P_1 \leftarrow 2P_1$" may denote a "double" operation (e.g., multiplying by two) of elliptic curve points. In S310 and S311, "$P_1 \leftarrow P_1+P_2$" and "$P_2 \leftarrow P_1+P_2$" may denote an addition of elliptic curve points (e.g., the values on the right side of the arrow are added together with the result being stored in the variable indicated on the left side). A determination may then be made as to whether i is less than zero (at S313). If i is not less than zero, the process 300 returns to S305 where i is decremented and the repetitive portion of the process 300 repeats. Otherwise, if i is less than zero, the first variable $P_1$ may be output as the scalar multiplication Q=k×P (at S315).

Referring to FIG. 3, both the addition and the double operation may be performed for each iteration or repetition of the process 300 (e.g., S305, S307, S310 or S311, and S313), which may degrade system performance. A level of system resource allocation to the process 300 may be reduced with scalar multiplication in which a Y-axis is redefined after loop computation excluding Y-axis computation.

To perform the double operation and the addition on $P_1(X_1, Z_1)$ and $P_2(X_2, Z_2)$, with $P_1$ and $P_2$ representing points (e.g., having an X-axis component and a Z-axis component, respectively) on an elliptic curve using the FMPLA, the double operation and the addition in the binary finite field may be respectively defined as follows:

$$\begin{cases} Z = Z_i^2 \cdot X_i^2 \\ X = X_i^4 + b \cdot Z_i^4 \end{cases} \qquad \text{Equation 5}$$

$$\begin{cases} Z_3 = (X_1 \cdot Z_2 + X_2 \cdot Z_1)^2 \\ X_3 = x \cdot Z_3 + (X_1 \cdot Z_2) \cdot (X_2 \cdot Z_1) \end{cases} \qquad \text{Equation 6}$$

In Equations 5 and 6 (above), a Y-axis may not be included within $P_1$ and $P_2$. In Equation 6, it may be assumed that the difference between the Z-axis coordinates of the difference between two points $P_1(X_1,Z_1)$ and $P_2(X_2,Z_2)$ (e.g., $Z_D=Z_2-Z_1$) may be "1". However, in a fault detecting process used in the FMPLA, this assumption may not necessarily be true. Accordingly, if the addition in Equation 6 is applied to the fault detecting process using the FMPLA, the ECC system may not accurately determine whether a fault or error is injected into the system, which may degrade performance of the ECC system.

SUMMARY OF THE INVENTION

An example embodiment of the present invention is directed to a method of performing a fault detection operation, including determining a first point and a second point in a binary finite field, the first and second points established based on a basic point within a given elliptic curve, each of the first and second points including a first coordinate value and a second coordinate value, performing a first addition operation on the first point and the second point to compute a third coordinate value and performing a second addition operation on the first and second points to compute a fourth coordinate value, the first and second addition operations computed based on at least one of a difference between the first coordinate values of the first and second points and a difference between the second coordinate values of the first and second points.

Another example embodiment of the present invention is directed to an apparatus for performing a fault detection operation, including a first-coordinate computing unit receiving a first point and a second point in a binary finite field, the first and second points established based on a basic point within a given elliptic curve, each of the first and second points including a first coordinate value and a second coordinate value, the first-coordinate computing unit performing a first addition operation on the first point and the second point to compute a third coordinate value and a second-coordinate computing unit performing a second addition operation on the first and second points to compute a fourth coordinate value, the first and second addition operations computed based on at least one of a difference between the first coordinate values of the first and second points and a difference between the second coordinate values of the first and second points.

Another example embodiment of the present invention is directed to a method and apparatus for adding points in a binary finite field in order to detect a fault without an error when performing a fault detecting operation in the Fast Montgomery Power Ladder Algorithm (FMPLA).

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention.

DETAILED DESCRIPTION OF EXAMPLE EMBODIMENTS

Figure 1:
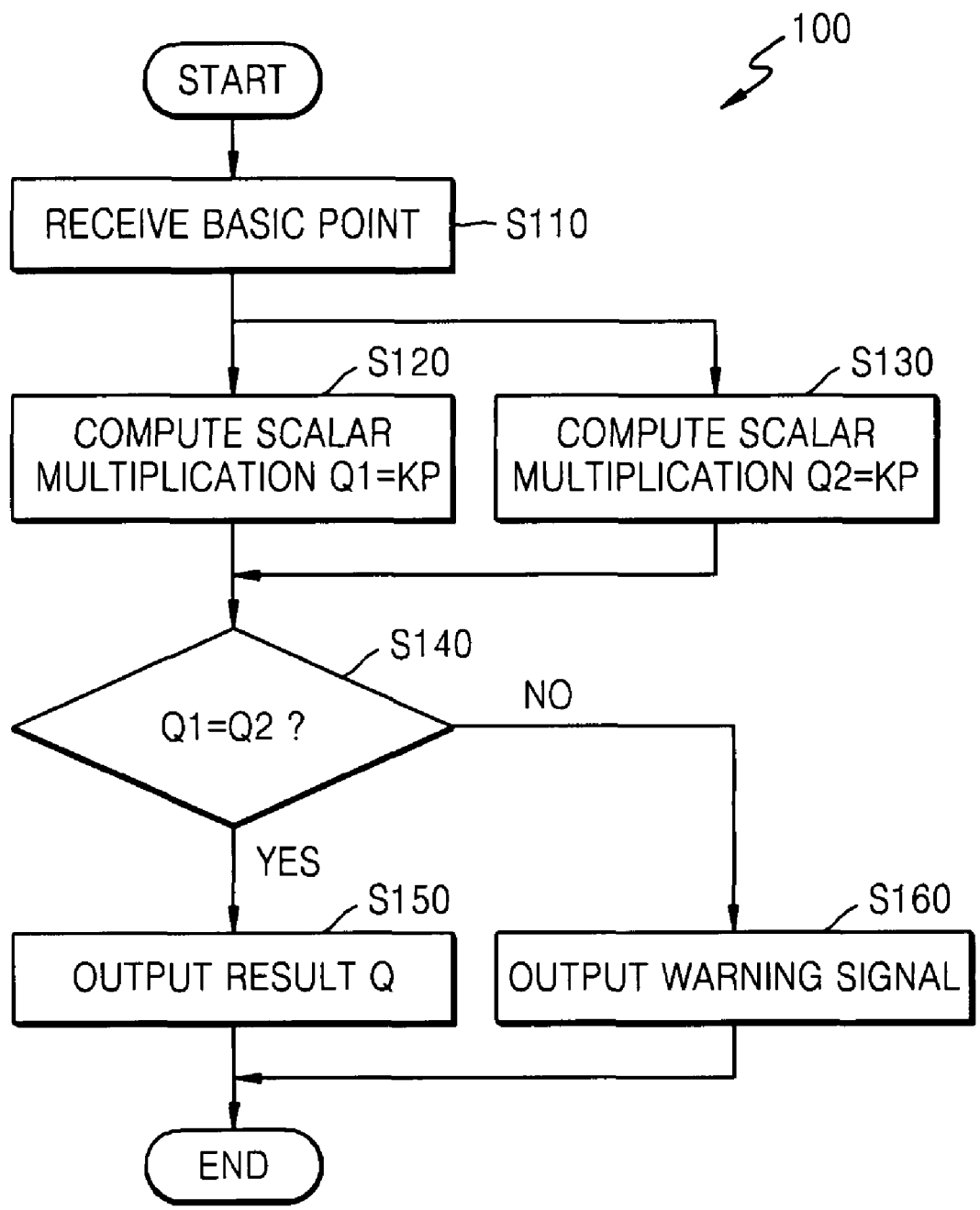
FIG. 1 is a flowchart illustrating a Calculate Twice and Check (CT&C) process corresponding to a conventional Differential Fault Analysis (DFA) countermeasure.
Figure 2:
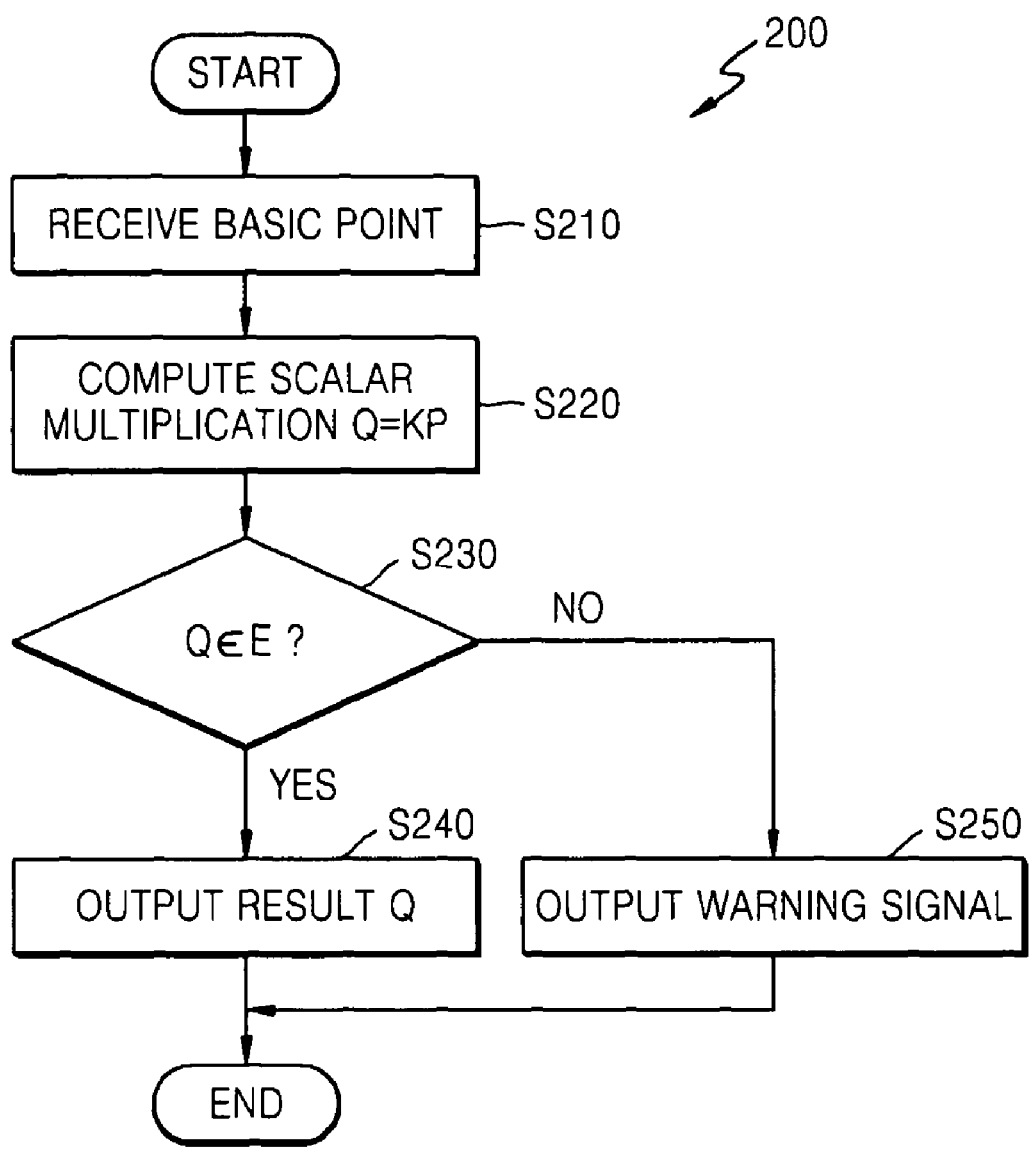
FIG. 2 is a flowchart illustrating a Check the Output Point (COP) process corresponding to another conventional DFA countermeasure.
Figure 3:
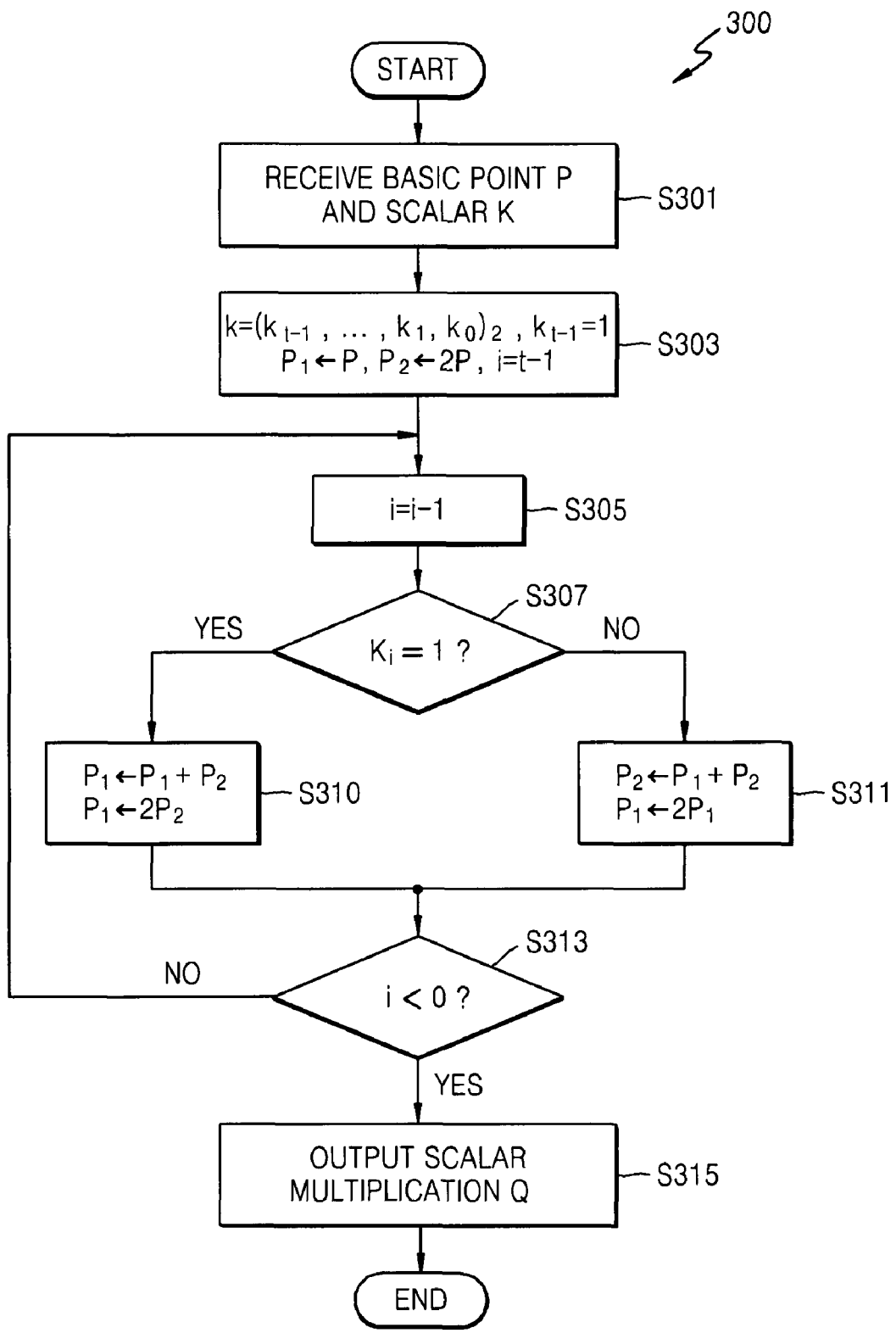
FIG. 3 is a flowchart illustrating a Montgomery Power Ladder Algorithm (MPLA) process for performing the scalar multiplication within a conventional Elliptic Curve Cryptography (ECC) system.

Detailed illustrative example embodiments of the present invention are disclosed herein. However, specific structural and functional details disclosed herein are merely representative for purposes of describing example embodiments of the present invention. Example embodiments of the present invention may, however, be embodied in many alternate forms and should not be construed as limited to the embodiments set forth herein.

Accordingly, while example embodiments of the invention are susceptible to various modifications and alternative forms, specific embodiments thereof are shown by way of example in the drawings and will herein be described in detail. It should be understood, however, that there is no intent to limit example embodiments of the invention to the particular forms disclosed, but conversely, example embodiments of the invention are to cover all modifications, equivalents, and alternatives falling within the spirit and scope of the invention. Like numbers may refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

First, a Fast Montgomery Power Ladder Algorithm (FMPLA) according to an example embodiment of the present invention will be described, followed by a fault detecting process based upon the example FMPLA according to other example embodiments of the present invention.

In an example fault detecting process, Equation 7 (below) may be derived from conventional Equations 2 and 3:

$$H_j = 2L_{j+1} + k_j + 1 = L_{j+1} + H_{j+1} + k_j = 2H_{j+1} + k_j - 1 \quad \text{Equation 7}$$

Equation 8 (below) may then be derived based on Equation 7, as shown below:

$$H_j = L_j + 1 \ 2H_{j+1} = H_j + 1|_{if(k_j = 0)} \quad \text{Equation 8}$$

wherein $H_j = L_j + 1$ may be expressed as shown in conventional Equation 2.

In order to determine whether an error or fault is injected in a previous computation, $H_j$ and $L_j$ may be included in a computation. A Montgomery process, in which the sum of two points $P_1$ and $P_2$ may be computed on X-axis coordinates without X-axis coordinates, may be based on information relating to the difference between the two points $P_1$ and $P_2$.

In order to use the Montgomery process to derive a fault checking operation, and satisfy the indistinguishability operation equilibrium according to power tracks analysis, two example conditions based on which logic level $k_j$ is set to may be employed.

In a first example condition, if $k_j$ is equal to a first logic level (e.g., a higher logic level or logic "1", such that $k_j = 1$), a fault checking operation may be performed as follows:

1. $L_j - 1$ may be computed by performing a "double" operation by:

$$L_j - 1 = 2L_{j+1} + k_j - 1|_{if(k_j = 1)} = 2L_{j+1} \quad \text{Equation 9}$$

2. $L_j + 1$ may be computed by performing an addition operation on the result the double operation.

3. $L_j+1=H_j$ may be checked for a fault or error. Here, $H_j$ may denote a previously computed value.

In a second example condition, if $k_j$ is equal to a second logic level (e.g., a lower logic level or logic "0", such that $k_j=0$), the fault checking operation may be performed as follows:

1. $2H_{j+1}$ may be computed by performing the double operation by:

$$H_j+1=2H_{j+1}+k_j-1+1|_{if(k_j=0)}=2H_{j+1}\qquad\text{Equation 10}$$

2. $H_j+1$ may be computed by performing the addition, in consideration of $L_j$.

3. $H_j+1=2H_{j+1}$, may be determined. Here, $2H_j+1$ may denote a previously computed value.

In an example, if a fault or error is not injected into the system, the difference between $L_j$ and $H_j$ may be equal to "1". Thus, if a fault is not injected in the above operation, $L_j+1=H_j$ and/or $H_j+1=2H_{j+1}$. Also, $H_j$ and $L_j$ may be used in the determination as to whether $L_j+1=H_j$ and/or whether $H_j+1=2H_{j+1}$, such that a determination as to whether a fault or error has occurred may be performed with respect to each of the two computed points.

Example embodiments of a fault checking process based on FMPLA will now be described in greater detail. In an example, a regular checking process and/or a random checking process may be performed to determine whether a fault or error is injected during performing the scalar multiplication. Further, an at-the-end checking process may be performed to determine whether a fault or error is injected, after performing the scalar multiplication and/or prior to outputting of a result of performing the scalar multiplication.

For example, the regular checking process may be performed to determine whether a fault or error is injected for each iteration or repetition of the scalar multiplication. In another example, the random checking process may be performed during the scalar multiplication only at randomly selected iterations or repetitions, and not necessarily for each iteration or repetition.

Figure 4:
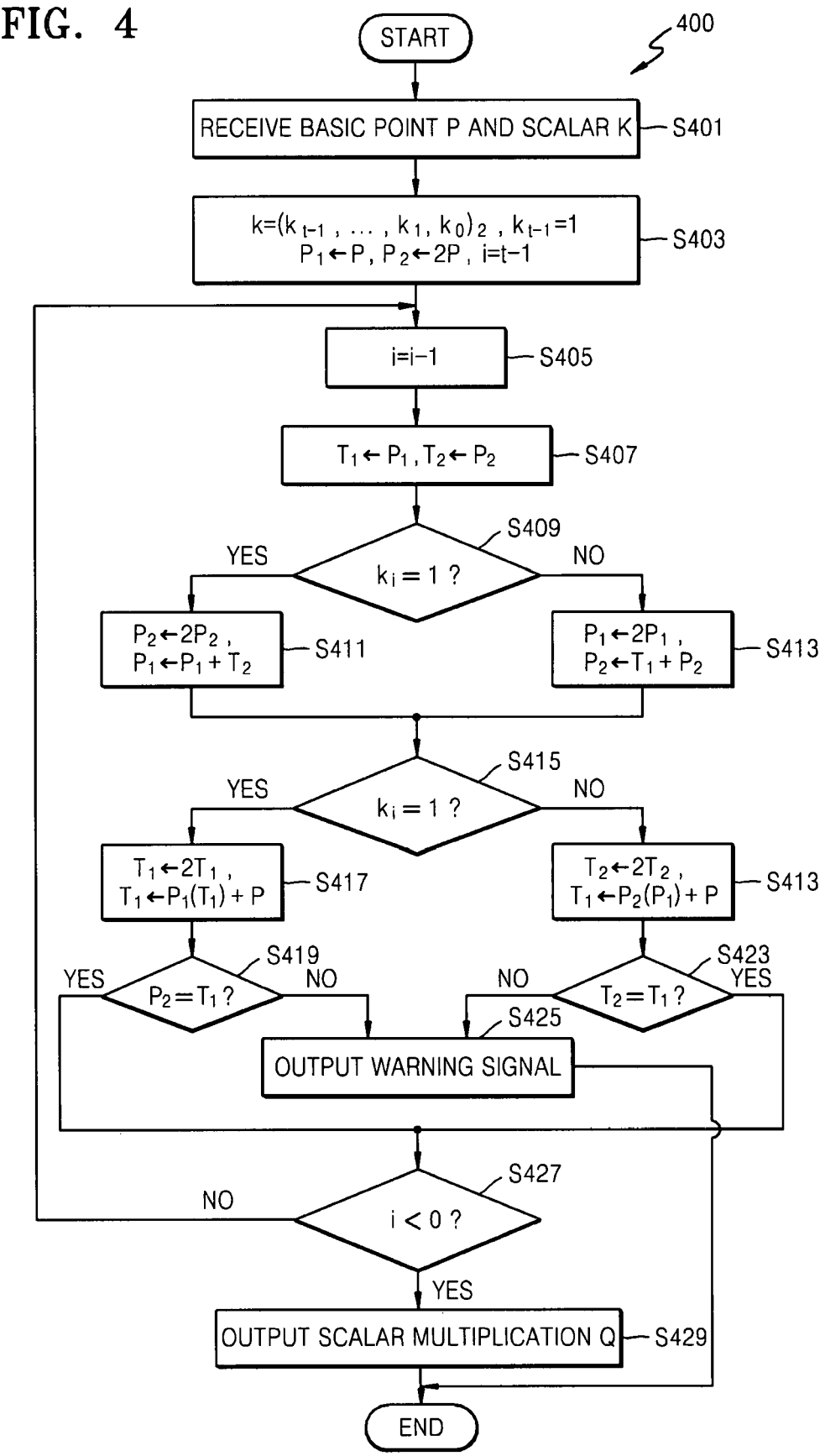
FIG. 4 is a flowchart illustrating a fault checking process according to an example embodiment of the present invention.

FIG. 4 is a flowchart illustrating a fault checking process 400 according to an example embodiment of the present invention. In the example embodiment of FIG. 4, checking may be performed for each iteration of a repeated portion of a scalar multiplication process. Generally, in the example embodiment of FIG. 4 basic point P and a scalar k may be received (at S401), and k and P may be used to perform scalar multiplication Q(=k×P) (at S429).

In the example embodiment of FIG. 4, the basic point P, which may be located on a given elliptic curve, may be stored in memory (e.g., an EEPROM). The scalar k has been described above respect to conventional Equation 2 in the Background of the Invention section. The basic point P and the scalar k may be received (at S401), and parameters or points for encryption may be reset or set (at S403).

In the example embodiment of FIG. 4, a first point $P_1$ and a second point $P_2$ may be reset using the basic point P (at S403). For example, the first point $P_1$ may be reset to the basic point P and the second point $P_2$ may be reset to double or twice that of the basic point P. After resetting the parameters (at S403), a repetitive operation may be performed to compute the scalar multiplication Q (at S405 through S413 and S427).

In the example embodiment of FIG. 4, counter i may designate a given bit among a number of binary bits within scalar k. In an example, the counter i may initially be set (e.g., during a first iterative of the repetitive or loop process) to one minus the maximum number of repetitions of the repetitive operation of FIG. 4 (at S405 through S413 and S427). Thus, for each repetition, the counter i may be decremented by 1 (at S405). Then, temporary variables $T_1$ and $T_2$ may be set to be equal to $P_1$ and $P_2$, respectively (at S407). If binary bit $k_i$ is equal to a first logic level (e.g., a higher logic level or logic "1") (at S409), then $P_2$ may be "doubled" and $T_2$ may be added to P1 (at S411). Otherwise, if binary bit $k_i$ is equal to a second logic level (e.g., a lower logic level or logic "0") (at S409), then $P_1$ may be "doubled" and $T_1$ may be added to P2.

In the example embodiment of FIG. 4, whether a fault is injected may be checked during each resetting of the variables and/or points, thus that fault-checking may be performed continuously (e.g., not just after all iterations of the repetitive operation). An operation of checking whether a fault is injected will now be described (S415 through S423).

In the example embodiment of FIG. 4, the binary bit $k_i$ may be analyzed to determine the binary bit $k_i$ corresponds to the first or second logic level (at S415). If the binary bit $k_i$ is determined to correspond to the first logic level (e.g., a higher logic level or logic "1"), T1 may be "doubled", and the sum of the first point $P_1$, which may be determined based on the first variable $T_1$ and the basic point P, may be reset to the first variable $T_1$ (at S417). The second point $P_2$ may then be compared with the reset first variable $T_1$ (at S419). If the second point $P_2$ and the reset first variable $T_1$ are equal to each other, a determination may be made that a fault has not been injected into the system; otherwise, a determination may be made that a fault has been injected into the system.

In the example embodiment of FIG. 4, if the binary bit $k_i$ is equal to the second logic level (e.g., a lower logic level or logic "0") (at S415), the second variable $T_2$ may be doubled, and the sum of the second point $P_2$, that may be determined according to the first variable $T_1$ and the basic point P, may be reset to the first variable $T_1$ (at S421). The doubled second variable $T_2$ may then be compared with the reset first variable $T_1$ (at S423). If the doubled second variable $T_2$ and the reset first variable $T_1$ are equal to each other, a determination may be made that a fault has not been injected into the system; otherwise, a determination may be made that a fault has been injected into the system.

In the example embodiment of FIG. 4, if it is determined that a fault is not injected (e.g., at S419 or S423), a determination may be made as to whether the counter i is less than 0 (at S427). If it is determined that the counter i is not less than 0, the process 400 may return to S405. Otherwise, if the counter i is less than 0, the first point $P_1$ may be output as the scalar multiplication Q (at S429). Otherwise, if it is determined that a fault is injected (e.g., at S419 or S423), a warning signal may be output (at S425).

Figure 5:
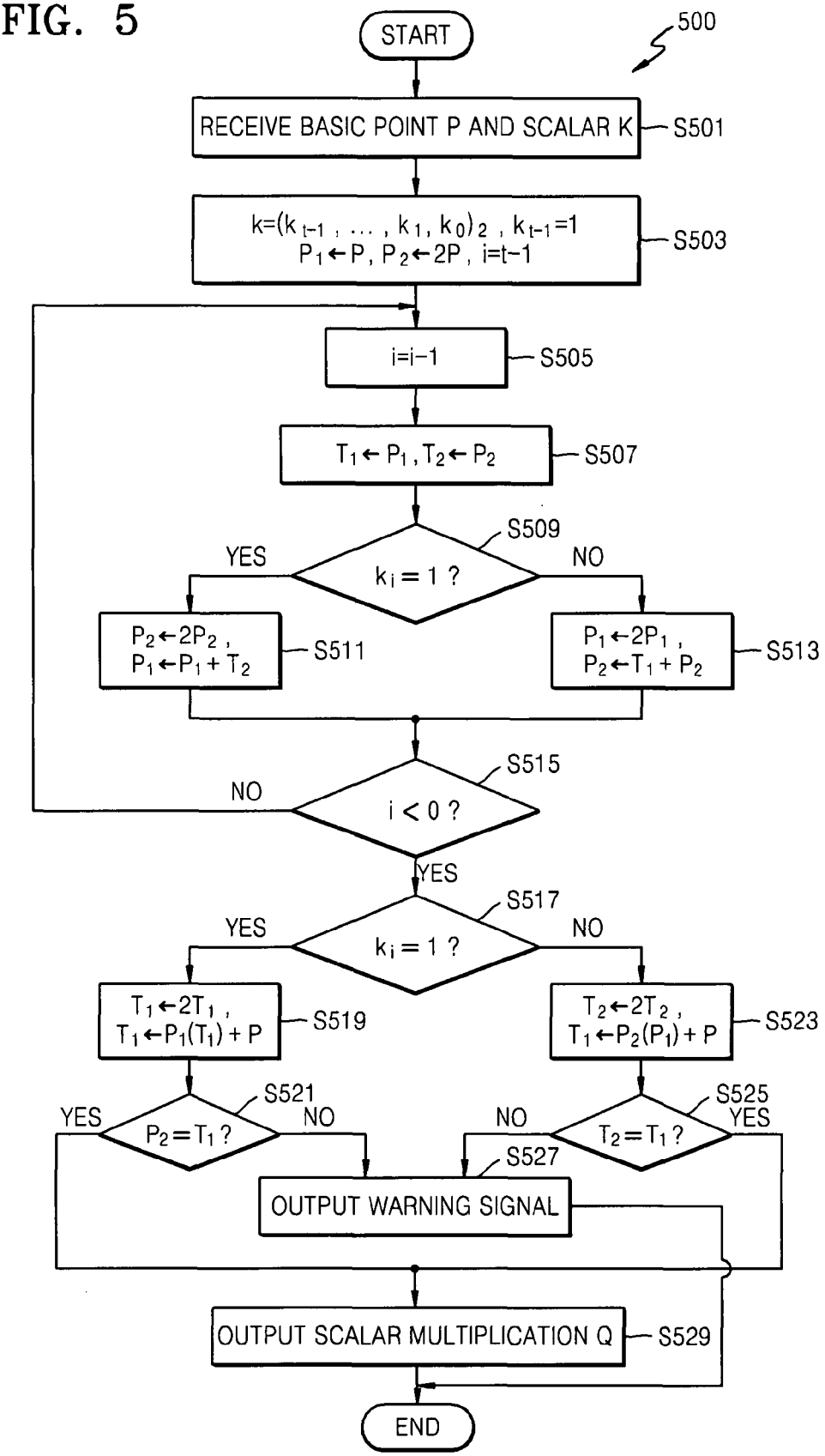
FIG. 5 is a flowchart illustrating a fault checking process according to another example embodiment of the present invention.

FIG. 5 is a flowchart illustrating a fault checking process 500 according to another example embodiment of the present invention. In the example embodiment of FIG. 5, fault checking may be performed after a series of repetitive scalar multiplications. Thus, similar to the process 400 of FIG. 4, a first point and a second point may be reset according to a binary bit $k_i$ (at S511 and S513). Then, a determination may be made as to whether the counter i is less than zero (at S515). As shown in the example embodiment of FIG. 5, the process 500 of FIG. 5 may be similar to the process 400 of FIG. 4 except that the determination of S427 may be moved to the position of S515 in FIG. 5, such that the "fault checking" steps may correspond to S517 to S527 in FIG. 5 (e.g., after the repetitive process or loop) as opposed to S415 to S427 (e.g., during each iteration of the repetitive process or loop).

Figure 6:
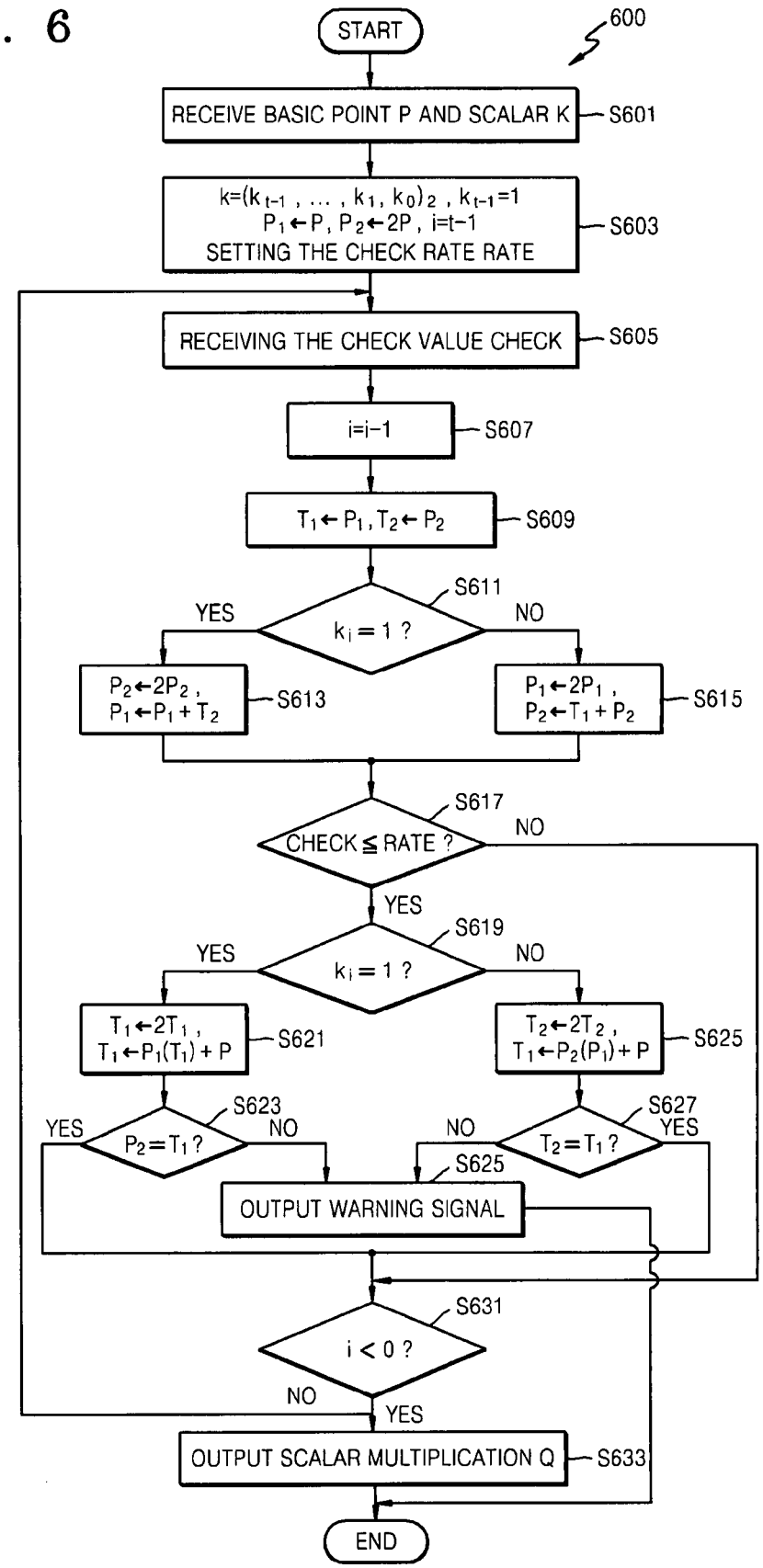
FIG. 6 is a flowchart illustrating a fault checking process according to another example embodiment of the present invention.

FIG. 6 is a flowchart illustrating a fault checking process 600 according to another example embodiment of the present invention. In the example embodiment of FIG. 6, an example "random" checking process may be performed to determine whether a fault is injected into the system after a scalar multiplication is performed In the example embodiment of FIG. 6, S601 may correspond to S501 of FIG. 5 and/or S401 of FIG. 4. S603 may also correspond to S503 of FIG. 5 and/or S403 of FIG. 4. However, in S603, a checking rate RATE may be set along with the parameters for encryption. A checking value CHECK, which may be randomly generated, may then be received (in S605). For example, both the checking value CHECK and the checking rate RATE may be in a range from 0 to 100. If the checking rate RATE is set to 70, and the randomly-generated checking value CHECK is 70 or less, a fault checking process (e.g., S619 through S625) may be performed. Otherwise, if the checking value CHECK is greater than 70, the fault checking process may not be performed and the process 600 may advance directly to S631.

Accordingly, it will be appreciated that the fault checking process may be performed for less than all of the binary bits ki, based on the values of the randomly-generated checking value CHECK and the established checking rate RATE. The checking rate RATE may be used to determine the frequency of checking whether a fault is injected.

In the example process 400 through 600 illustrated in FIGS. 4 through 6, respectively, the "double" operation and the addition may be performed on points on an elliptic curve in order to reset a first point $P_1$ and a second point $P_2$. However, as described above, if the addition expressed in Equation 6 is used as the addition performed in 413, 417, 519, 523, 621, and/or 625, it may not be possible to perfectly perform fault detection.

Figure 7:
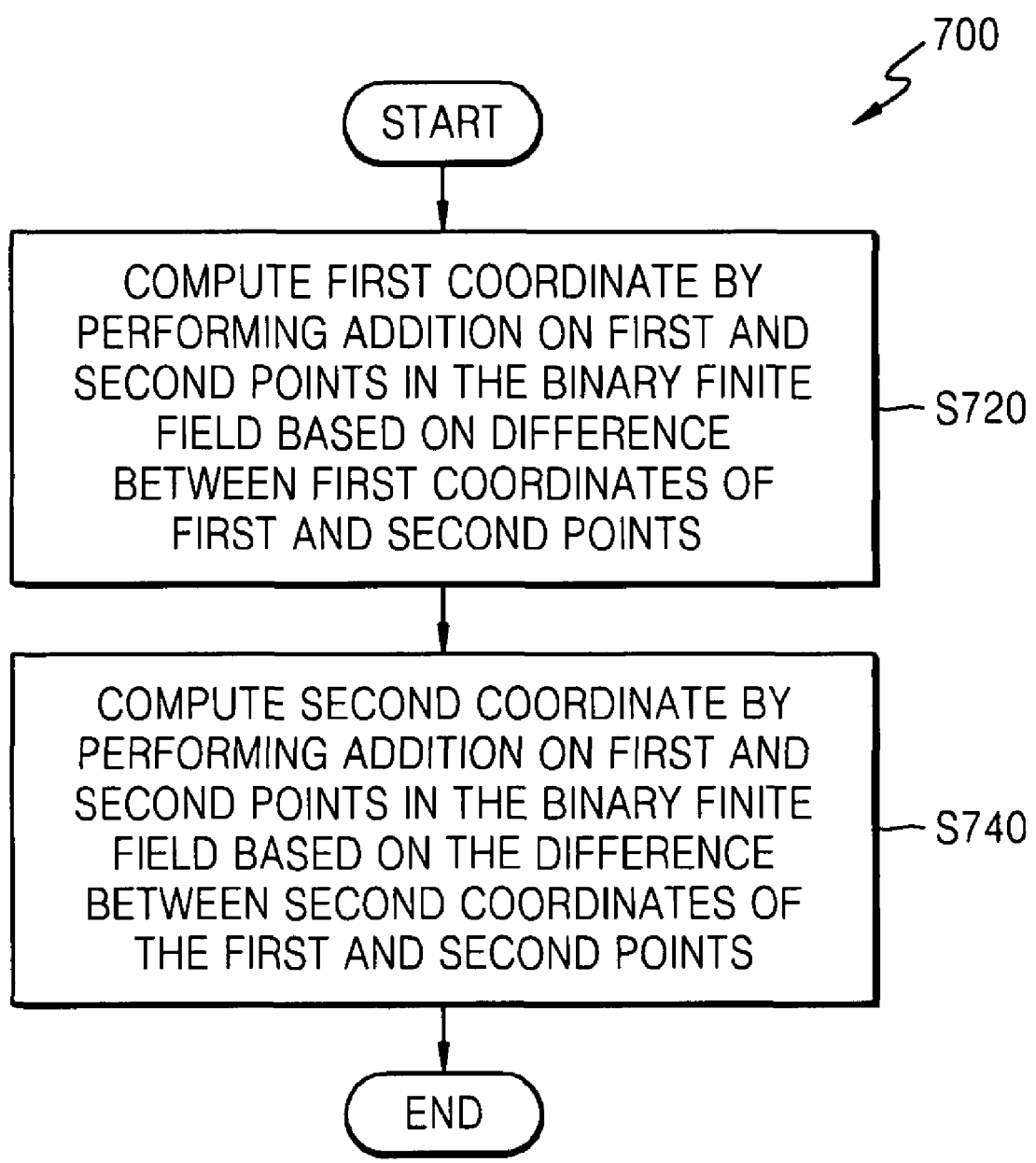
FIG. 7 is a flowchart illustrating a process of adding points in a binary finite field to perform a fault detecting process used in a fast MPLA (FMPLA) according to another example embodiment of the present invention.

FIG. 7 is a flowchart illustrating a process 700 of adding points in a binary finite field to perform a fault detecting process used in a FMPLA according to another example embodiment of the present invention.

In the example embodiment of FIG. 7, a first coordinate ($X_3$) may be computed by performing an addition operation based on a first point and a second point in the binary finite field (at S720). In an example, the first and second points may be set using a basic point on an elliptic curve, in the binary finite field (S720). A second coordinate ($Z_3$) may then be computed by performing another addition operation on the first point and the second point in the binary finite field (at S740).

A result $P_3(X_3, Z_3)$ of performing the addition on the first and second points $P_1$ and $P_2$ in the binary finite field may be expressed as follows:

$$\begin{cases} Z_3 = Z_D \cdot (X_1 \cdot Z_2 + X_2 \cdot Z_1)^2 \\ X_3 = X_D \cdot (X_1 \cdot Z_2 + X_2 \cdot Z_1)^2 + Z_D \cdot (X_1 \cdot Z_2) \cdot (X_2 \cdot Z_1) \end{cases} \quad \text{Equation 11}$$

In another example, a basic point P may indicate a point on Affine coordinates, and thus, the second coordinate of the second point $P_2$ may be replaced with a "1". In an example, the result $P_3(X_3, Z_3)$ of performing the addition on the first and second points $P_1$ and $P_2$ in the binary finite field may be expressed as follows:

$$\begin{cases} Z_3 = Z_D \cdot (X_1 + X_2 \cdot Z_1)^2 \\ X_3 = X_D \cdot (X_1 + X_2 \cdot Z_1)^2 + Z_D \cdot X_1 \cdot (X_2 \cdot Z_1) \end{cases} \quad \text{Equation 12}$$

As illustrated in Equations 11 and 12, the difference $Z_D$ between the second coordinates of the first and second points $P_1$ and $P_2$ may be used during the addition operation for two points ($P_1$ and $P_2$) in the binary finite field, thereby more accurately or precisely performing a fault detecting process using the Montgomery algorithm.

Figure 8:
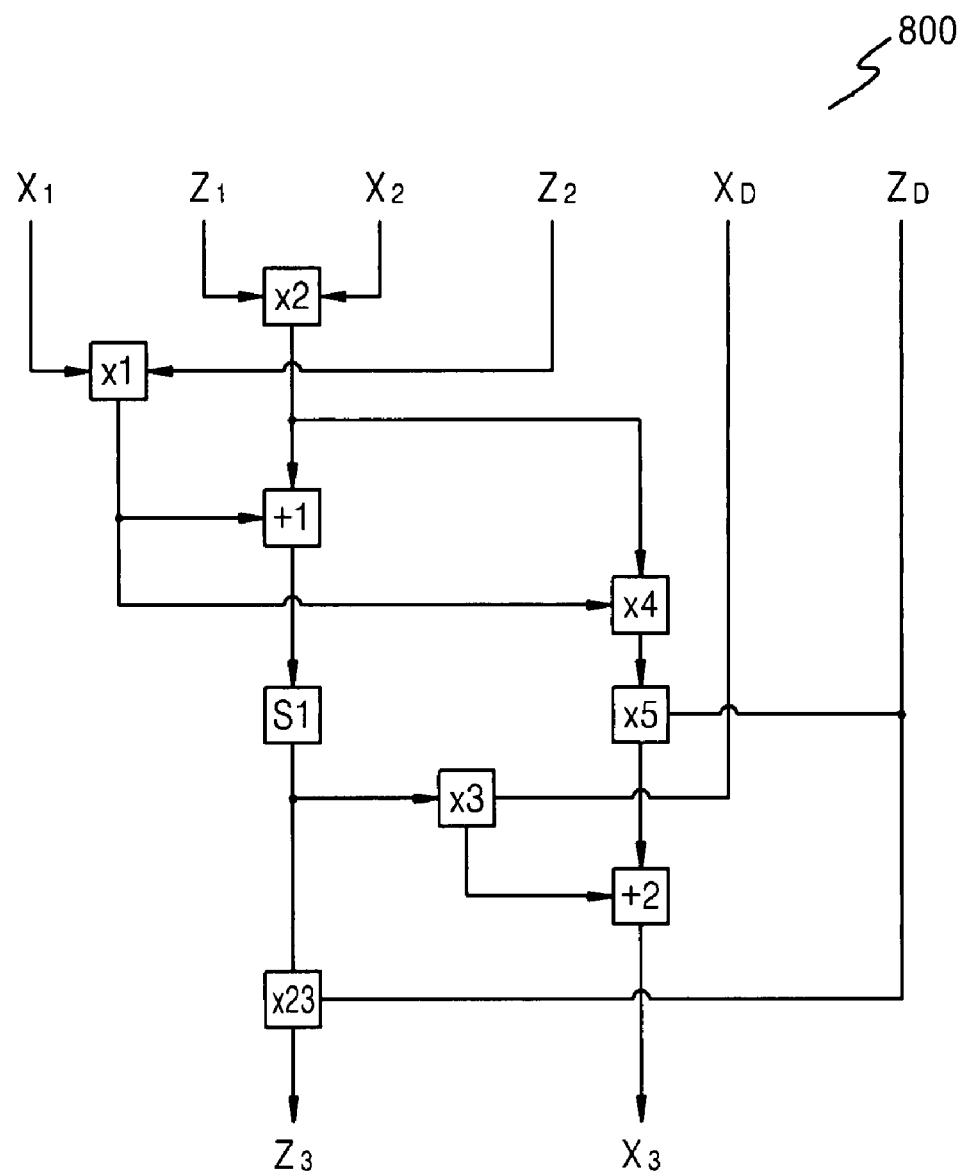
FIG. 8 is a circuit diagram of an apparatus for adding points in the binary finite field to perform a fault detecting process using the FMPLA, according to another example embodiment of the present invention.

FIG. 8 is a circuit diagram of an apparatus 800 for adding points in the binary finite field to perform a fault detecting process using the FMPLA, according to another example embodiment of the present invention.

In the example embodiment of FIG. 8, the apparatus 800 may include a first-coordinate computing unit and a second-coordinate computing unit. The first-coordinate computing unit may compute a first coordinate $X_3$ by performing the addition on a first point $P_1$ and a second point $P_2$, with the first and second points $P_1$ and $P_2$ being set using a basic point on an elliptic curve, in the binary finite field. The second-coordinate computing unit may compute a second coordinate $Z_3$ by performing an addition on the second coordinates of the first point $P_1$ and the second point $P_2$ in the binary finite field.

In the example embodiment of FIG. 8, the first and second-coordinate computing units may respectively compute the first and second coordinates $X_3$ and $Z_3$ based on the difference between the second coordinates of the first and second points $P_1$ and $P_2$.

In the example embodiment of FIG. 8, the first-coordinate computing unit may include first through fifth multipliers X1 through X5, first and second adders +1 and +2 and a first squaring unit S1. The first multiplier X1 may compute a first multiplication value ($X_1 \times Z_2$) by multiplying $X_1$ by $Z_2$. The second multiplier X2 may compute a second multiplication value ($X_2 \times Z_1$) by multiplying $X_2$ by $Z_1$. The first adder +1 may compute a first addition value ($X_1 \times Z_2 + X_2 \times Z_1$) by adding the first multiplication value and the second multiplication value. The first squaring unit S1 may compute a first square (($X_1 \times Z_2 + X_2 \times Z_1)^2$) by squaring the first addition value. The first squaring unit S1 may square the first addition value by squaring the first addition value. The third multiplier X3 may compute a third multiplication value ($X_D \times (X_1 \times Z_2) + X_2 \times Z_1)^2$) by multiplying the first square by $X_D$.

In the example embodiment of FIG. 8, the fourth multiplier X4 may compute a fourth multiplication value (($X_1 \times Z_2) \times (X_2 \times Z_1)$) by multiplying the first multiplication value by the second multiplication value. The fifth multiplier X5 may compute a fifth multiplication value ($Z_D \times (X_1 \times Z_2) \times (X_2 \times Z_1)$) by multiplying the fourth multiplication value by $Z_D$.

In the example embodiment of FIG. 8, the second adder +2 may compute an X coordinate ($X_3$), which may be the result of performing the addition on the first and second points in the binary finite field, by adding the third multiplication value and the fifth multiplication value.

In the example embodiment of FIG. 8, the second computing unit C22 may include multipliers X21, X22, and X23, an adder +21 and a squaring unit S21. The multiplier X21 may compute a multiplication value ($X_1 \times Z_2$) by multiplying $X_1$ by $Z_2$. The multiplier X22 may compute a multiplication value ($X_2 \times Z_1$) by multiplying $X_2$ by $Z_1$. The adder +21 may compute an addition value ($X_1 \times Z_2 + X_2 \times Z_1$) by adding the multiplication value ($X_1 \times Z_2$) of the multiplier X21 and the multiplication value ($X_2 \times Z_1$) of the multiplier X22.

In the example embodiment of FIG. 8, the squaring unit S21 may compute a square (($X_1 \times Z_2 + X_2 \times Z_1)^2$) by squaring the addition value of the adder +21. The squaring unit S21 may square the addition value by adding the addition value of the adder +21 with the addition value of the adder +21. The multiplier X23 may compute a Z-coordinate ($Z_3$), which may be the result of performing the addition on the first and second points in the binary finite field, by multiplying the square by $Z_D$. In an example, the multiplier X21 and the multiplier X22 of the second-coordinate computing unit may correspond to the first multiplier X1 and the second multiplier X2 of the first-coordinate computing unit, respectively. In another example, the adder +21 and the squaring unit S21 of the second-coordinate computing unit may correspond to the first adder +1 and the first squaring unit S1 of the first-coordinate computing unit, respectively.

In an example, Equation 11 may be computed by the apparatus 800 of FIG. 8, and Equation 12 may be computed by another example apparatus for adding points in the binary finite field, which will now be described with reference to FIG. 9.

Figure 9:
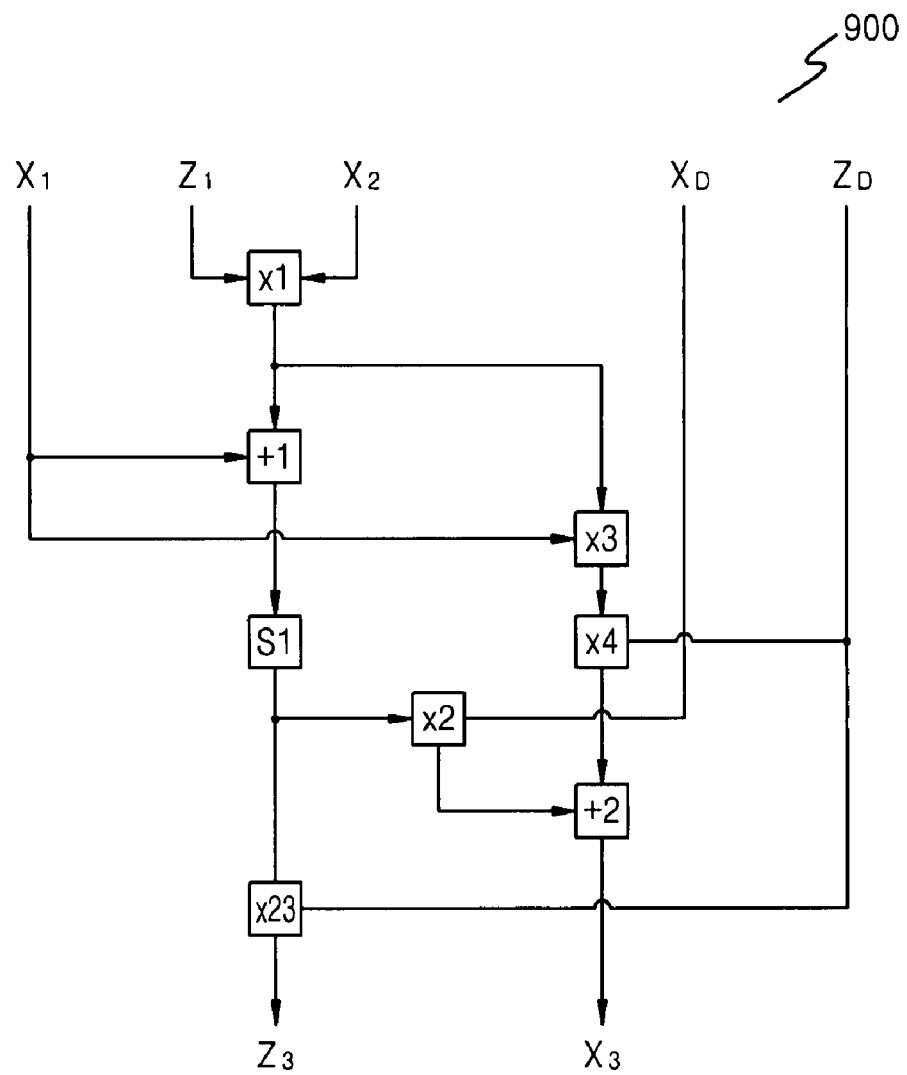
FIG. 9 is a circuit diagram of an apparatus for adding points in the binary finite field to perform a fault detecting process using the FMPLA, according to another example embodiment of the present invention.

FIG. 9 is a circuit diagram of an apparatus 900 for adding points in the binary finite field to perform a fault detecting process using the FMPLA, according to another example embodiment of the present invention.

In the example embodiment of FIG. 9, the example operation of the apparatus 900 may be the same as that of the apparatus 800 of FIG. 8, except that the apparatus 900 of FIG. 9 may further perform the addition on points if a second coordinate (e.g., a Z coordinate) of second point $P_2$ is equal to the first logic level (e.g., a higher logic level or logic "1"). Therefore, the apparatus 900 may be structurally similar to that of the apparatus 800 of FIG. 8, while including fewer multipliers as compared to the apparatus 800. In another example, a construction and operation of the first-coordinate computing unit and the second-coordinate computing unit of the apparatus 900 may be the same as that of the apparatus 800 of FIG. 8.

Figure 10:
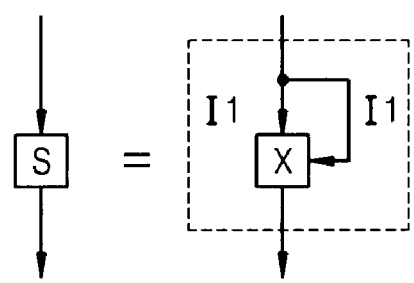
FIG. 10 illustrates a squaring unit according to another example embodiment of the present invention.

FIG. 10 illustrates a squaring unit S according to another example embodiment of the present invention. In an example, the example squaring unit S may be included as the squaring units described above with respect to the example embodiments of FIG. 8 and/or 9.

In the example embodiment of FIG. 10, the squaring unit S may multiply a given input value 11 by itself. In an example, the squaring unit S may correspond to the first squaring unit S1 and the squaring unit S21 illustrated in FIGS. 8 and 9. The squaring unit S may be configured such that an input value may be multiplied by itself, thereby reducing a layout area of the apparatus 800 and/or 900 of FIGS. 8 and 9, respectively.

In another example embodiment of the present invention, a method and apparatus for adding points in the binary finite field may be capable of more accurately or precisely performing a fault detecting process in a cryptographic system that uses the FMPLA.

Example embodiments of the present invention being thus described, it will be obvious that the same may be varied in many ways. For example, while the example embodiments of charge pump circuits are above described directed to FMPLA, it is understood that other example embodiments of the present invention may be directed to any well-known fault detection process (e.g. MPLA, etc.).

Further, it is understood that the above-described first and second logic levels may correspond to a higher level and a lower logic level, respectively, in an example embodiment of the present invention. Alternatively, the first and second logic levels/states may correspond to the lower logic level and the higher logic level, respectively, in other example embodiments of the present invention.

Such variations are not to be regarded as a departure from the spirit and scope of example embodiments of the present invention, and all such modifications as would be obvious to one skilled in the art are intended to be included within the scope of the following claims.

What is claimed is:

1. A method of determining coordinates for a fault detection operation, comprising:

determining a first point and a second point in a binary finite field, the first and second points established based on a basic point within a given elliptic curve, each of the first and second points including a first coordinate value and a second coordinate value;

performing a first addition operation on the first point and the second point to compute a third coordinate value, using a first-coordinate computing unit; and performing a second addition operation on the first and second points to compute a fourth coordinate value, using a second-coordinate computing unit, the first and second addition operations computed based on at least one of a difference between the first coordinate values of the first and second points and a difference between the second coordinate values of the first and second points;

determining whether a fault has been injected into a cryptographic system based on a resultant point, the resultant point being a point represented by the third and fourth coordinate values; and issuing a warning based on the determination, wherein the first coordinate values and the third coordinate value correspond to X-axis coordinates and the second coordinate values and the fourth coordinate value correspond to Z-axis coordinates, and wherein if the first point is denoted as $P_1(X_1, Z_1)$, the second point is denoted as $P_2(X_2, Z_2)$, a difference point between $P_1$ and $P_2$ is denoted as $P_D(X_D, Z_D)$, the third coordinate value is denoted as $X_3$, the fourth coordinate value is denoted as $Z_3$, and the resultant point is denoted as $P_3(X_3, Z_3)$, the first and second additional operations are respectively represented as follows:

$$\begin{cases} Z_3 = Z_D \cdot (X_1 + X_2 \cdot Z_1)^2 \\ X_3 = X_D \cdot (X_1 + X_2 \cdot Z_1)^2 + Z_D \cdot X_1 \cdot (X_2 \cdot Z_1). \end{cases}$$

2. The method of claim 1, wherein the fault detecting operation is performed within an elliptic curve cryptography system employing a fast Montgomery power ladder algorithm (FMPLA).

3. The method of claim 1, wherein the second coordinate value of the second point ($Z_2$) is equal to 1.

4. The method of claim 1, wherein the second coordinate value of the second point has a fixed value.

5. The method of claim 4, wherein the fault detecting operation is performed within an elliptic curve cryptography system employing a fast Montgomery power ladder algorithm (FMPLA).

6. The method of claim 4, wherein the second coordinate value of the second point is equal to 1.

7. The method of claim 6, wherein, if the first point is denoted as $P_1(X_1, Z_1)$, the second point is denoted as $P_2(X_2, 1)$, a difference point between $P_1$ and $P_2$ is denoted as $P_D(X_D, Z_D)$, the third coordinate value is denoted as $X_3$, the fourth coordinate value is denoted as $Z_3$, and the resultant point is denoted as $P_3(X_3, Z_3)$, the first and second additional operations are respectively represented as follows:

$$\begin{cases} Z_3 = Z_D \cdot (X_1 \cdot Z_2 + X_2 \cdot Z_1)^2 \\ X_3 = X_D \cdot (X_1 \cdot Z_2 + X_2 \cdot Z_1)^2 + Z_D \cdot (X_1 \cdot Z_2) \cdot (X_2 \cdot Z_1). \end{cases}$$

8. An apparatus for determining coordinates for a fault detection operation, comprising:
a first-coordinate computing unit receiving a first point and a second point in a binary finite field, the first and second points established based on a basic point within a given elliptic curve, each of the first and second points including a first coordinate value and a second coordinate value, the first-coordinate computing unit performing a first addition operation on the first point and the second point to compute a third coordinate value; and
a second-coordinate computing unit performing a second addition operation on the first and second points to compute a fourth coordinate value, the first and second addition operations computed based on at least one of a difference between the first coordinate values of the first and second points and a difference between the second coordinate values of the first and second points,
wherein the apparatus is configured to determine whether a fault has been injected into a cryptographic system based on a resultant point, the resultant point being a point represented by the third and fourth coordinate values,
wherein the first coordinate values and the third coordinate value correspond to X-axis coordinates and the second coordinate values and the fourth coordinate value correspond to Z-axis coordinates, and
wherein, if the first point is denoted as $P_1(X_1, Z_1)$, the second point is denoted as $P_2(X_2, Z_2)$, a difference point between $P_1$ and $P_2$ is denoted as $P_D(X_D, Z_D)$, the third coordinate value is denoted as $X_3$, the fourth coordinate value is denoted as $Z_3$, and the resultant point is denoted as $P_3(X_3, Z_3)$, the first and second additional operations are respectively represented as follows:

$$\begin{cases} Z_3 = Z_D \cdot (X_1 + X_2 \cdot Z_1)^2 \\ X_3 = X_D \cdot (X_1 + X_2 \cdot Z_1)^2 + Z_D \cdot X_1 \cdot (X_2 \cdot Z_1). \end{cases}$$

9. The apparatus of claim 8, wherein the first and second coordinate computing units are included within an elliptic curve cryptography system employing a fast Montgomery power ladder algorithm (FMPLA).

10. The apparatus of claim 8, wherein the first-coordinate computing unit includes:
a first multiplier computing a first multiplication value $(X_1 \times Z_2)$ by multiplying $X_1$ by $Z_2$;
a second multiplier computing a second multiplication value $(X_2 \times Z_1)$ by multiplying $X_2$ by $Z_1$;
a first adder computing a first addition value $(X_1 \times Z_2 + X_2 \times Z_1)$ by adding the first multiplication value and the second multiplication value;
a squaring unit computing a square $(X_1 \times Z_2 + X_2 \times Z_1)^2$ by squaring the first addition value;
a third multiplier computing a third multiplication value $(X_D \times (X_1 \times L_2) + X_2 \times Z_1)^2$ by multiplying the first square by $X_D$;
a fourth multiplier computing a fourth multiplication value $((X_1 \times Z_2) \times X_2 \times Z_1))$ by multiplying the first multiplication value by the second multiplication value;

a fifth multiplier computing a fifth multiplication value $(Z_D \times (X_1 \times Z_2) + X_2 \times Z_1))$ by multiplying the fourth multiplication value by $Z_D$; and
a second adder computing the third coordinate value $(X_3)$ by adding the third multiplication value and the fifth multiplication value.

11. The apparatus of claim 10, wherein the squaring unit multiplies the first addition value by the first addition value.

12. The apparatus of claim 8, wherein the second computing unit includes:
a first multiplier computing a first multiplication value $(X_1 \times Z_2)$ by multiplying $X_1$ by $Z_2$;
a second multiplier computing a second multiplication value $(X_2 \times Z_1)$ by multiplying $X_2$ by $Z_1$;
a first adder computing a first addition value $(X_1 \times Z_2 + X_2 \times Z_1)$ by adding the first multiplication value and the second multiplication value;
a squaring unit computing a square $((X_1 \times Z_2 + X_2 \times Z_1)^2)$ by squaring the first addition value; and
a third multiplier computing the fourth coordinate value $(Z_3)$ by multiplying the first multiplication by $Z_D$.

13. The apparatus of claim 12, wherein the squaring unit multiplies the first addition value by the first addition value.

14. The apparatus of claim 8, wherein the second coordinate of the second point has a fixed value.

15. The apparatus of claim 14, wherein the first and second coordinate computing units are included within an elliptic curve cryptography system employing a fast Montgomery power ladder algorithm (FMPLA).

16. The apparatus of claim 15, wherein the second coordinate of the second point is equal to "1".

17. The apparatus of claim 16, wherein, if the first point is denoted as $P_1(X_1, Z_1)$, the second point is denoted as $P_2(X_2, 1)$, a difference point between $P_1$ and $P_2$ is denoted as $P_D(X_D, Z_D)$, the third coordinate value is denoted as $X_3$, the fourth coordinate value is denoted as $Z_3$, and the resultant point is denoted as $P_3(X_3, Z_3)$, the first and second additional operations are respectively represented as follows:

$$\begin{cases} Z_3 = Z_D \cdot (X_1 + X_2 \cdot Z_1)^2 \\ X_3 = X_D \cdot (X_1 + X_2 \cdot Z_1)^2 + Z_D \cdot X_1 \cdot (X_2 \cdot Z_1). \end{cases}$$

18. The apparatus of claim 17, wherein the first-coordinate computing unit includes:
a first multiplier computing a first multiplication value $(X_2 \times Z_1)$ by multiplying $X_2$ by $Z_1$;
a first adder computing a first addition value $(X_1 + X_2 \times Z_1)$ by adding the first multiplication value and $X_1$;
a squaring unit computing a square $((X_1 \times Z_2 + X_2 \times Z_1)^2)$ by squaring the first addition value;
a second multiplier computing a second multiplication value $(X_D \times (X_1 \times Z_2 + X_2 \times Z_1)^2)$ by multiplying the first square by $X_D$;
a third multiplier computing a third multiplication value $(X_1 \times (X_2 \times Z_1))$ by multiplying the first multiplication value by $X_1$;
a fourth multiplier computing a fourth multiplication value $(Z_D \times X_1 \times (X_2 \times Z_1))$ by multiplying the third multiplication value by $Z_D$; and
a second adder computing an the third coordinate value $(X_3)$, by adding the second multiplication value and the fourth multiplication value.

19. The apparatus of claim 18, wherein the squaring unit multiplies the first addition value by the first addition value.

20. The apparatus of claim 17, wherein the second computing unit includes:
- a first multiplier computing a first multiplication value ($X_2 \times Z_1$) by multiplying $X_2$ by $Z_1$;
- a first adder computing a first addition value ($X_1+X_2 \times Z_1$) by adding the first multiplication value and $X_1$;
- a squaring unit computing a first square (($X_1+X_2 \times Z_1)^2$) by squaring the first addition value; and
- a third multiplier computing the fourth coordinate value ($Z_3$) by multiplying the first square by $Z_D$.

21. The apparatus of claim 20, wherein the first squaring unit multiplies the first addition value by the first addition value.

* * * * *